DOUGLAS D. DOONAN
INVENTOR.
BY Frank C. Parker
Charles C. Krawczyk
ATTORNEYS

DOUGLAS D. DOONAN
*INVENTOR.*
BY Frank C. Parker
Charles C. Krawczyk
ATTORNEYS

DOUGLAS D. DOONAN
INVENTOR.
BY Frank C. Parker
Charles C. Krawczyk
ATTORNEYS

DOUGLAS D. DOONAN
INVENTOR.
BY Frank C. Parker
Charles C. Krawczyk
ATTORNEYS

United States Patent Office 3,465,143

Patented Sept. 2, 1969

3,465,143

SWITCHING SYSTEM FOR DETECTING A PLURALITY OF PHYSICAL QUANTITIES IN A CONSECUTIVE TIMING SEQUENCE

Douglas D. Doonan, Rochester, N.Y., assignor to Bausch & Lomb Incorporated, Rochester, N.Y., a corporation of New York

Filed Dec. 9, 1965, Ser. No. 512,672
Int. Cl. G01j *3/08*
U.S. Cl. 250—43.5 7 Claims

ABSTRACT OF THE DISCLOSURE

A switching system is disclosed for systems detecting a plurality of physical quantities in a consecutive timing sequence. The physical quantities are applied to a detecting device by a motor drive switching device. The switching system includes a plurality of magnetic operated switches mounted adjacent to magnetic means for actuation thereof. The detecting device is coupled to the switches. A magnetic shield having a magnetic flux transmitting window is coupled to the motor for movement between the magnetic means and the switches to synchronously activate the switches in accord with the timing sequence in which the physical quantities are applied to the detector.

This invention relates to switching circuits in general and more particularly to synchronous magnetic switching circuits.

In various types of electronic scientific equipment, a number of individual tests are made in timed sequence using a single detecting device to produce a composite electrical signal that must be separated for processing thereof, or a single test is made with a plurality of detecting devices providing a plurality of measurements in timed sequence in the form of electrical signals that must be combined for processing. The separation or combination of such signals and the later rectification thereof requires a switching circuit that functions in synchronization with the tests or measurements being made.

An example of such scientific equipment is a double beam spectrophotometer wherein the transmission or absorption properties of various materials in response to applied radiation (ultraviolet, visible ad infrared) is measured. In the double beam spectrophotometer, monochromatic radiation is split into two radiation beams and directed to a pair of cells, one of which contains a sample specimen and the other a reference specimen. The split radiation beams are transformed into alternating cycles of radiation pulses by a beam switch or chopper so that each cycle of radiation pulses consists of a short period of illumination (on the order of 90°) and a longer period of darkness (approximately 270 degrees) and wherein the phase of one beam of radiation is timed approximately 180° out of phase with the other.

A photosensitive device such as a photomultiplier senses the alternating radiation pulses and generates a composite series signal of alternating reference and sample electrical pulses, the amplitudes of which corresponds to the intensity of the light transmitted through the sample and reference cells. A pulse separator is connected for synchronously separating the reference and sample pulses. The sample pulses are processed and detected to provide a reading that is a function of the sample transmission characteristics. The reference pulses in addition are processed to provide a control voltage to control the gain of the photomultiplier tube and compensate for the variations in the radiation signal and for changes in photomultiplier sensitivity due to changes of applied wavelength.

The separator and detector circuits are synchronized with the operation of the beam switch or chopper to provide a required degree of signal separation so that signals can be accurately integrated to provide a direct current signal that is proportional to the respective signal pulse height. In addition since capacitive coupled amplifier circuits are generally employed to avoid the problems characteristic of direct coupled amplifiers, such as drift due to temperature and component changes, a zero signal level must be reestablished after amplification to provide the required degree of accurate signal detection.

It is advantageous to have a fast switching or chopping rate, on the order of a thousand cycles per minute so that the signals corresponding to the transmission level of the sample can be rectified and integrated and the gain of the photomultiplier stabilized per applied wavelength within a reasonable time. To be more effective, the separator and detector circuits should be synchronized to operate during the period the beam switch fully illuminates the photosensitive device so that pulses can be more readily integrated. The cam operated micro-switch or relay circuits employed in prior systems having low chopping rates were found ineffective at the higher chopping rate. The combination of a "sync-lock" chopper motor and synchronous choppers, although operable at high speeds such as alternating current line frequency, is expensive and does not include means for variably adjusting the phase relation between the signal and chopping frequency.

It is therefore an object of this invention to provide a new and improved synchronous magnetic switching circuit.

It is also an object of this invention to provide an inexpensive synchronous magnetic switching circuit adapted to be employed in spectrophotometer instruments and the like.

It is still a further object of this invention to provide a new and improved synchronous magnetic switching circuit for separating a plurality of sequential signals.

It is also an object of this invention to provide a new and improved synchronous magnetic switching circuit for separating and synchronously detecting a plurality of sequential signals.

It is still a further object of this invention to provide a new and improved synchronous magnetic switching circuit including provisions for adjusting the switching sequence with respect to the phase relation of the synchronous signal to be switched.

In a switching circuit embodying the invention a plurality of magnet sensitive switching devices, such as reed switches, are mounted adjacent a magnetic means that provides a magnetic field for actuating the switching devices. A magnetic shield is movably mounted between the switching devices and the magnetic means to block the magnetic field from actuating selected ones of the switching devices depending upon its position. The magnetic shield is coupled to a movable shaft of an electrical motor for synchronous movement with the shaft. The motor shaft is also coupled to drive a signal modulating means so that a synchronous relation is maintained between the signal modulation means and the switching sequence of the switching devices. The modulated signal is coupled to the switching devices so that the switching devices function to synchronously separate portions of the modulated signals and/or provide a synchronous detection circuit for the modulated signals.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

Figure 1:
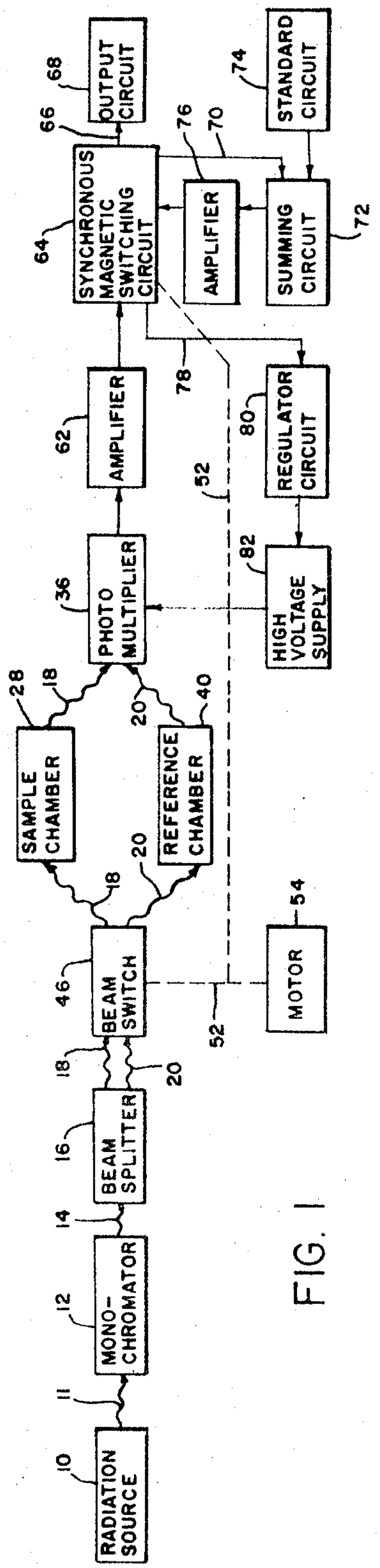
FIGURE 1 is a block diagram of a spectrophotometer including the magnetic switching circuit of the invention.
Figures 2, 3:
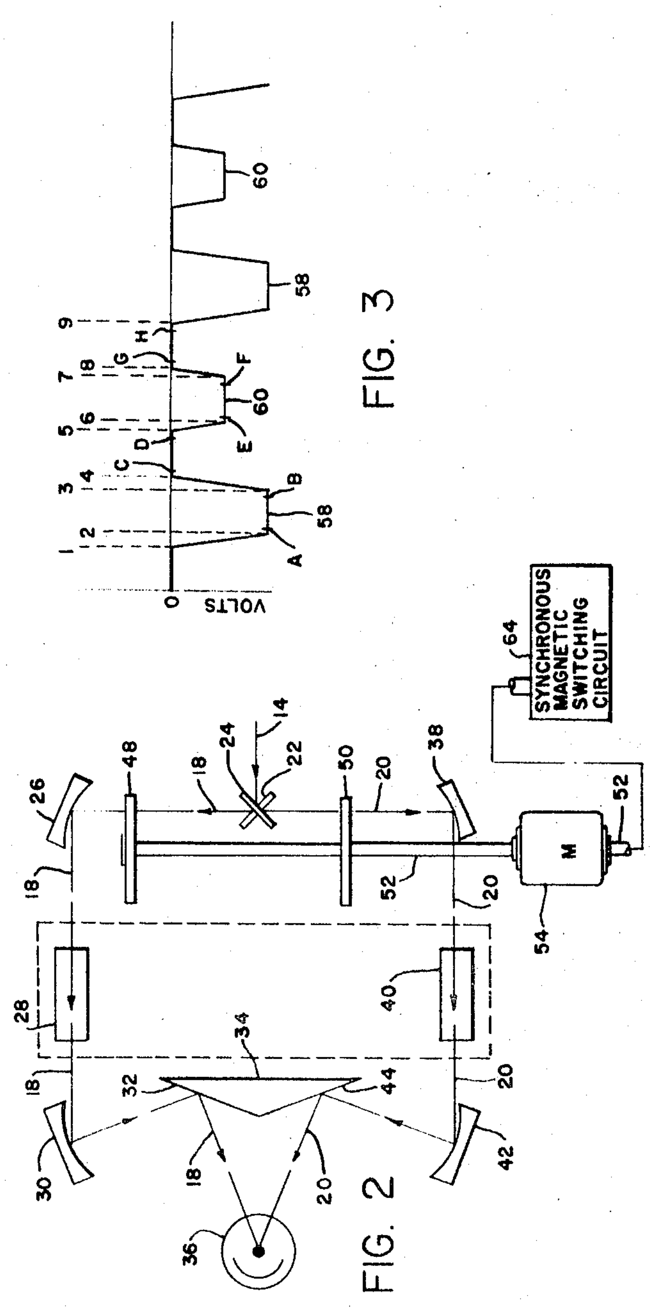
FIGURE 2 is a diagrammatic plan view of a portion of the optical system of spectrophotometer of FIGURE 1 illustrating the operation of the beam switch and its relation to the magnetic switching circuit.
FIGURE 3 is an illustration of the electrical signal generated by the photomultiplier of FIGURE 1.

Referring to the drawings and more particularly to FIGURES 1 and 2, a source of radiation 10 casts a beam of radiation 11 into a monochromator 12 wherein the spectrum of radiation is dispersed to provide a beam of monochromatic radiation 14 (effectively a limited band of wavelengths) over a wide range of wavelengths. The beam of monochromator radiation 14 falls upon a beam splitter 16 which splits the beam of monochromatic radiation into a sample beam 18 and a reference beam 20.

The beam splitter 16 in the present embodiment includes a plurality of mirrors 22 and 24 superimposed at approximately right angles (FIGURE 2). A portion of the beam of monochromatic radiation 14 is reflected by the mirror 22 on a spherical mirror 26 to form the sample beam. The spherical mirror 26 directs the beam through a cell 28 containing a sample specimen to be studied, and then to another spherical mirror 30 where the sample beam 18 is again directed and reflected to a plano mirror surface 32 of a prism 34. The light reflected from the surface 32 falls on a photosensitive device 36 which can be, for example, a photomultiplier tube.

Similarly, the mirror 24 of the beam splitter 16 reflects another portion of the beam of monochromatic radiation 14 on a spherical mirror 38 to form the reference beam 20. The spherical mirror 38 directs the reference beam 20 through a cell 40 containing a standard or reference specimen and then again to another spherical mirror 42 where the beam is reflected to another plano surface 44 of the prism 34. The radiation reflected from the surface 44 (reference beam 20) falls upon the photomultiplier device 36 at approximately the same point as does the sample beam 18.

A beam switch 46 is positioned between the beam splitter mirrors 22 and 24 and the spherical mirrors 26 and 38 to modulate or chop the radiation reflected from the mirrors. The beam switch 46 comprises a pair of disks 48 and 50 mounted on a common shaft 52 which is driven by a motor 54. The disks 48 and 50 are formed with an arcuate slot 56 (see FIGURE 4) extending for an angle of in the order of 87° and are adapted to chop the sample and reference radiation beams 18 and 20 respectively before they enter the sample and reference cells 28 and 40. The disks 48 and 50 are mounted on the shaft 52 so that the slots 56 are diametrically opposed or spaced 180° in respect to the axis of the shaft. The motor 54 rotates the disks 48 and 50 interrupting the sample and reference beams of radiation 18 and 20 so that the beams fall alternately upon the photomultiplier 36, the sample beam 18 being indicative of the characteristics of the sample specimen, and the reference beam 20 being indicative of the characteristics of the reference samples.

The photomultiplier tube 36 generates electrical signals in response to the alternate beams of radiation impinging thereon as illustrated in FIGURE 3. For purposes of illustration it can be assumed that the larger pulses 58 are reference pulses and the smaller pulses 60 are sample pulses. This corresponds to a case wherein the transmission characteristics of the reference specimen is greater than that of the sample specimen.

During the period between points 1–4 (FIGURE 3) the reference beam 20 is transmitted through the slot in 56 of the disk 50. On the other hand, during the time between points 5–8 the sample beam 18 passes through the slot 56 in the disk 48. During the periods between points 4–5 and 8–9 the photomultiplier tube 36 is not illuminated and the output level corresponds to the tube dark current. For the periods between 2–3 and 6–7 the photomultiplier tube 36 is fully illuminated and a substantially constant electrical signal is generated corresponding to the transmission characteristics of the reference and sample pulses respectively. Between the periods 1–2, 3–4, 5–6 and 7–8 the photomultiplier tube 36 is not fully illuminated resulting in a transient condition.

The electrical signals are amplified by a capacitive coupled amplifier circuit 62 and are coupled to a synchronous magnetic switching circuit 64. The synchronous magnetic circuit 64 is mechanically coupled to the motor 54 shaft 52 (FIGURES 1 and 2) so that the operation of the synchronous magnetic switching circuit is mechanically synchronized with the operation of the beam switch 46.

The synchronous magnetic switching circuit 64 provides a plurality of functions. For example, the synchronous magnetic switching circuit separates the reference and sample pulses 58 and 60 (FIGURE 3), establishes a reference level for the separated signals, rectifies the sample pulses to develop a pulsating direct current output 66 which is coupled to an output circuit 68, and applies the separated reference pulses through the conductor 70 to a summing circuit 72 wherein the reference pulses are compared with a standard signal developed by the standard circuit 74. The difference between the amplitude of the reference pulses and the standard signal is coupled back to the synchronous magnetic switching circuit 64 through a capacitive coupled amplifier 76 wherein the synchronous magnetic switching circuit 64 synchronously detects the amplified difference signal and applies the detected signals through a conductor 78 to a power supply regulator circuit 80. The power supply regulator circuit 80 filters the rectified difference signals to produce a direct current signal which is used to control the magnitude of voltage developed by the high voltage power supply circuit 82 that is applied to the photomultiplier tube 36 thereby controlling the gain of the photomultiplier.

Figure 5:
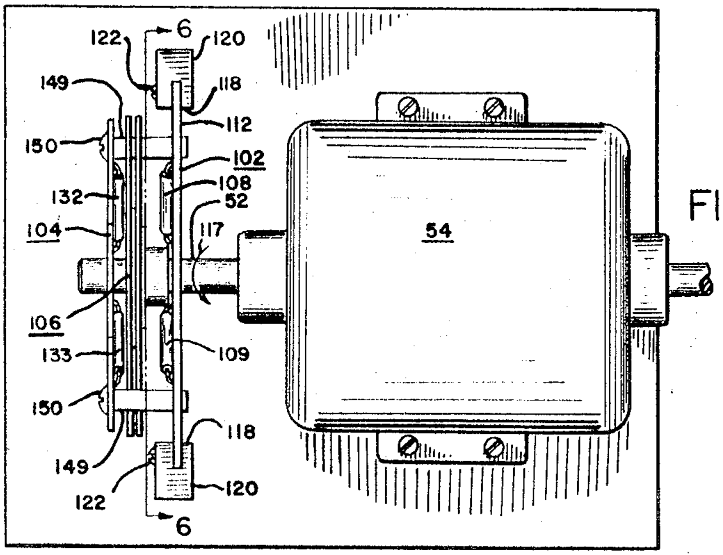
FIGURE 5 is an illustration of an embodiment of a synchronous magnetic switching circuit of FIGURE 1 connected to a drive motor.

Referring now to FIGURE 5, an embodiment of a magnetic switching circuit includes a stationary mounted magnetic means 102, a switching circuit 104 mounted thereto, and a movable magnetic shield 106 positioned between the magnetic means 102 and the switching circuit 104. The magnetic shield 106 is coupled to the motor shaft 52 to rotate synchronously with the shaft.

Figure 6:
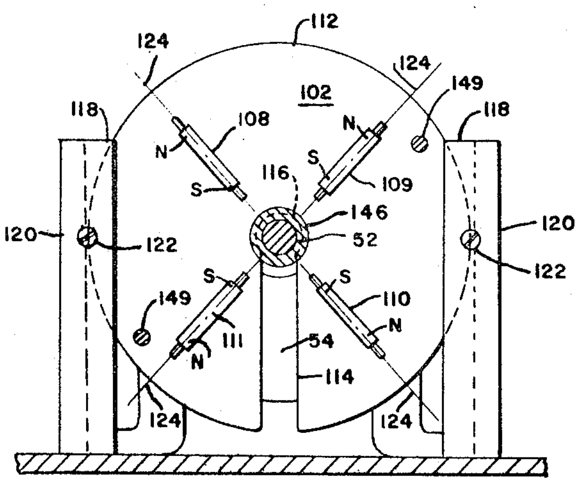
FIGURE 6 is a cross section view of FIGURE 5 taken along lines 6—6.

The magnetic means 102 in the present embodiment includes four magnets 108–111 (FIGURE 6) mounted on a circular non-magnetic disk 112. The disk 112 includes a slot 114 extending from the edge of the disk to the center hole 116 (shown dashed). The disk 112 is mounted by inserting the edge of the disk 112 into a pair of slots 118 in a pair of mounting struts 120 so that the shaft 52 passes through the slot 114 into the hole 116. The disk 112 is adjusted for a desired angular position and secured in the position by a pair of screws 122. The magnets 108–111 are mounted on the disk along separate lines 124 extending radially from the center of the disk and separated by an angle of 90° so that their poles are aligned with the lines.

Figure 10:
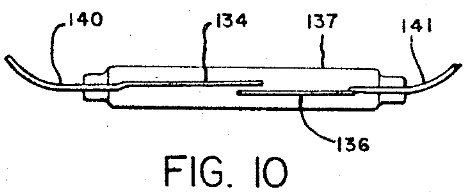
FIGURE 10 is an enlarged view of a reed switch of FIGURE 5.

The switching circuit 104 (FIGURE 7) includes a printed circuit board 126 having seven magnetic sensitive switching devices 127–133, illustrated as reed switches, mounted thereon. The reed switches 127–133 include a pair of contacts 134 and 136 (FIGURE 10) enclosed in a glass envelope 137 having the leads 140 and 141 connected to the contacts respectively. In the presence of a magnetic field the contacts 134 and 136 make electrical contact. The reed switches can also include normally closed contacts that open in the presence of a magnetic field.

The reed switches 127–133 are mounted on the printed circuit board 126 in a manner similar to the magnets 108–111 on the disk 112. The switches 127, 129, 131 and 133 are mounted axially along the lines 134 that extend radially from the center of a mounting hole 136 and are separated by an angle of 90°. The switches 128, 130 and 132 are mounted along side the switches 127, 129 and 131 respectively in a counterclockwise direction as indicated by the arrow 135. The leads 140 and 141 of the various reed switches are connected to the printed circuit wiring 138 (shown dashed) providing means for making electrical connection thereto.

Figure 4:
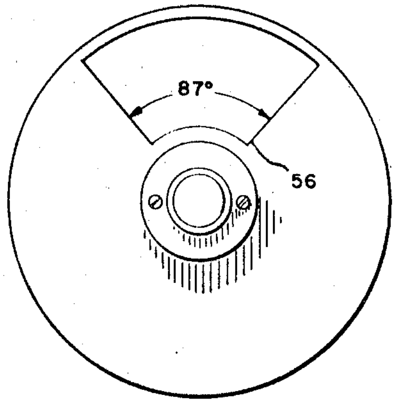
FIGURE 4 is an illustration of the disks included in the beam switch of FIGURE 2.
Figure 9:
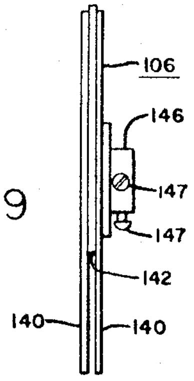
FIGURE 9 is a side view of the magnetic shield of FIGURE 8.
Figure 8:
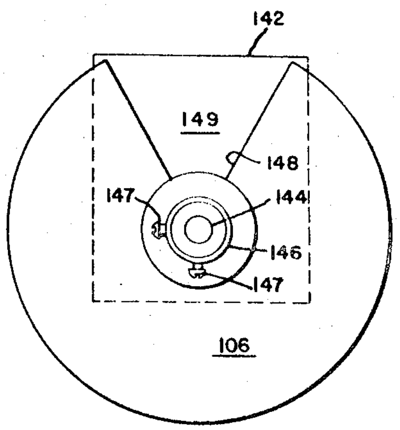
FIGURE 8 is an illustration of magnetic shield of the switching circuit of FIGURE 5.

The magnetic shield 106 in the present embodiment (FIGURES 8 and 9) includes two circular disks 140 made of high permeability magnetic material, such as transformer iron, separated by a rectangular portion of non-magnetic material 142 such as brass. The circular disks 140 and the non-magnetic portion 142 include a mounting hole 144 so that magnetic shield 106 is mounted on the shaft 52 by the coupling 146 and screws 147. Each of the circular disks 140 includes an arcuate slot 148 extending for an angle approximately that of the arcuate slot 56 of the beam switch disks 48 and 50 (FIGURE 4). When the magnetic shield 106 is assembled the arcuate slots 148 of the disks 140 and the rectangular brass portion 142 are aligned as illustrated so that a portion of the magnetic shield 106 includes a non-magnetic window 149 of the shape of the slots 148. The brass portion 142 provides a counter-balancing effect as well as a non-magnetic window so that the magnetic shield may be rotated at high speeds. If desired, the brass portion 142 may be eliminated so that the disk 140 will resemble that of beam switch disks 48 and 50 (FIGURE 4).

The switching circuit 104 is mounted on the disk 112 (FIGURE 5) adjacent the magnetic shield 106 by the use of a pair of spacers 149 fastened to the disk 112 and a pair of screws 150 extending through the holes 152 (FIGURE 7) in the printed circuit board 126. The planes including the disk 112 and the printed circuit board 126 are substantially parallel and the lines 124 are in substantially parallel relation with a corresponding line 134. The magnetic field generated by the magnetic means 102 is restricted to the high permeability magnetic shield 106 except for the portion adjacent the window 149. As the magnetic shield 106 is rotated, the window 149 passes between successive ones of the reed switches and the associated magnets wherein the magnetic field passes through the window 149 and actuates the corresponding switch or switches. As the motor shaft 52 rotates in the direction designated by the arrow 117 in FIGURE 5 the pairs of switches will be actuated in a timing sequence designated by the arrow 135 in FIGURE 7. For example, the window will first pass switches 127 and 128, then 130 and 129, then 131 and 132 and finally 133 for a continuous actuation sequence.

It should be noted that the disk 112 is adjustably mounted in the mounting strut 120. By loosening the screws 122, the disk can be rotated to take any angular position with respect to the slots 56 in the beam switch disks 48 and 50. This provides a continuous adjustment for presetting any desired phase relation between the actuation of the reed switches 127–133 and the electrical signal developed by the photomultiplier tube 36. In addition, since the beam switch disks 46 and 48 and the magnetic shield 106 are mounted for rotation by the same shaft, the signals generated by the photomultiplier tube 36 and the switching action of the magnetic switching circuit 64 will always have a synchronous relation. As a result, the speed of the motor 54 is not critical since any change in speed changes the beam chopping rate and the magentic switching circuit switching rate by the same amount. In contrast, the prior art systems employing electronic choppers synchronized to the line frequency required a special and expensive "sync-lock" motor that locked in on a particular phase of the line voltage to provide the required phase relation between the beam switch and the chopper type separator and detector circuits. Any loss in motor speed would result in erroneous readings.

Figure 11:
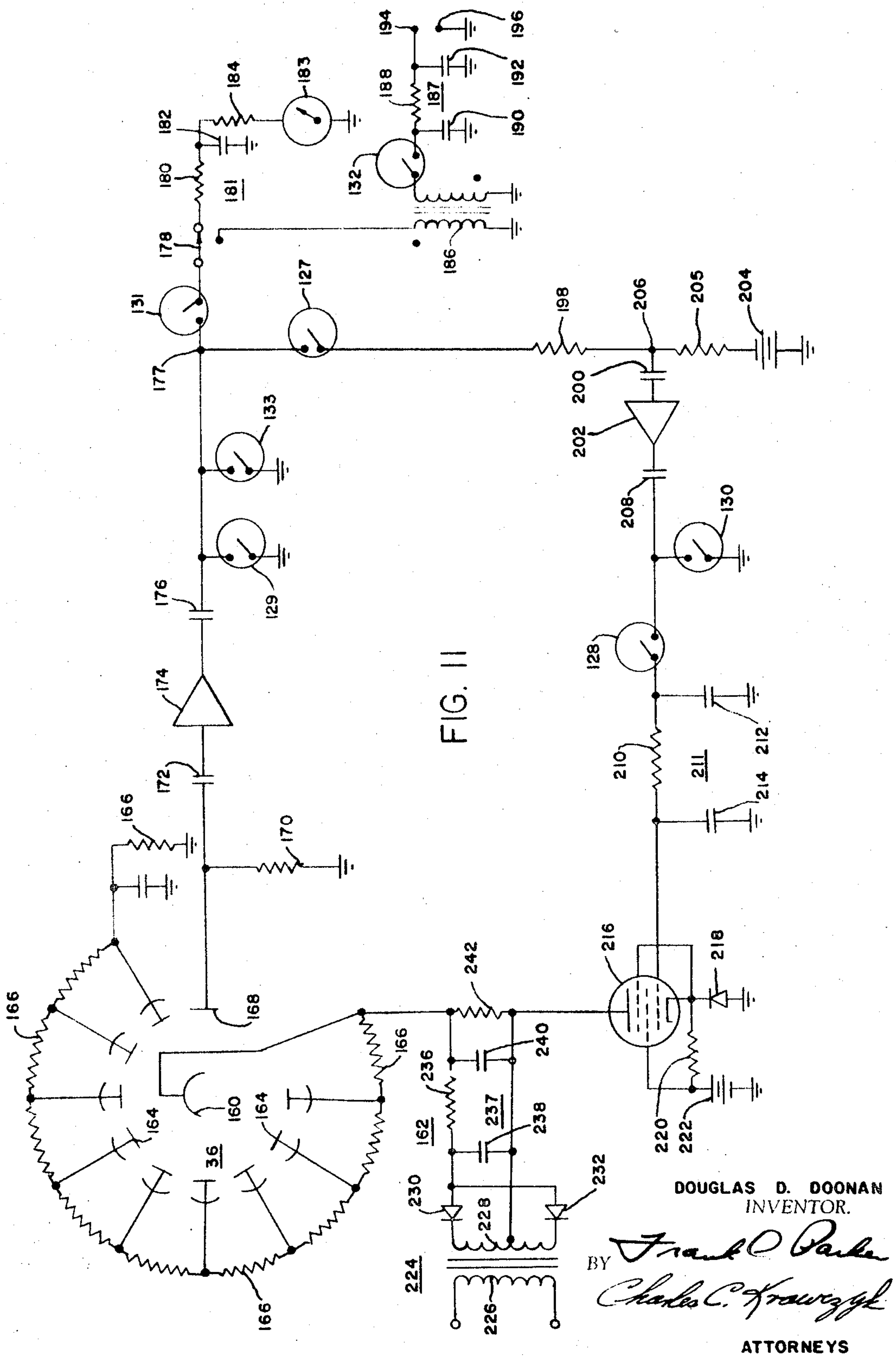
FIGURE 11 is a circuit schematic diagram of a portion of the spectrophotometer of FIGURE 1.

Referring now to the schematic diagram of FIGURE 11, the photomultiplier tube 36 is connected to generate electrical signals in response to the reference and sample beams impinging on a radiation sensitive photo cathode 160. The photo cathode 160 is directly connected to a high voltage power supply 162 while the plurality of photomultiplier tube dynodes 164 are connected to consecutive portions of a voltage divider 166 connected between the high voltage power supply 162 and ground. The anode 168 is connected to ground through a resistor 170 and through a capacitor 172 to an amplifier 174.

The electrical pulses generated by the photomultiplier tube 36 are amplified by amplifier 174 and coupled through a capacitor 176 to a common contact point 177 of the reed switches 127, 129, 131 and 133 of the magnetic switching circuit 64. The reed switches in the schematic diagram of FIGURE 11 are designated by the same reference numerals as the corresponding reed switches of FIGURES 5 and 7. The other contacts of the reed switches 129 and 133 are connected to ground for grounding the connected side of the capacitor 176 during periods of zero photomultiplier tube 36 irradiation thereby referencing the common point 177 to the dark current generated by the photomultiplier tube.

The two reed switches 127 and 131 function to separate and detect the reference and sample pulses. The second contact of the reed switch 131 is connected to a sample processing channel including an output selector switch 178. In one position the switch 178 applies the sample pulse to an integrating circuit 181 comprising a resistor 180 and a capacitor 182 connected in series to ground. A direct current meter 183 is coupled across the capacitor 182 through the resistor 184, to provide a direct current reading that is proportional to the average of the sample pulse amplitudes. In the other position, the switch 178 applies sample pulses across the primary winding of a polarity reversing transformer 186. The secondary winding of the transformer 136 is coupled through the synchronous rectifying reed switch 132 to a filter circuit 187 including the series resistance 188 and the parallel capacitors 190 and 192 to provide a direct current output at the terminals 194 and 196 that is the opposite polarity applied to the meter.

The reference pulses are coupled through the reed switch 127 and applied through a summing resistor 198 to a summing point 206. A source of standard or reference potential 204 (illustrated as a battery) is also coupled to the summing point 206 through a summing resistor 205. The polarity of the source of reference potential 204 is the same as the reference pulses so that the difference between the amplitude of the reference pulses and the amplitude of the reference potential appears at the summing point 206. In addition, a signal phase reversal develops at the summing point 206 depending upon the relative amplitudes of the reference pulses and the reference potential. For example, if the amplitude of the reference pulses is greater than that of the reference potential, the difference signal is in phase with the reference pulses.

On the other hand if the amplitude of the reference pulses is less than the reference potential, the difference signal is 180° out of phase with the reference pulse.

The difference signal developed at the summing point 206 is coupled through a capacitor 200 to an amplifier 202. The amplified different signals are coupled through a capacitor 208 to a common contact of the reed switches 128 and 130. The other contact of the reed switch 130 is connected to ground and is synchronously timed to provide a reference level for the detection of the amplified difference signals. The reed switch 128 is synchronized to rectify the difference signals. The polarity of the rectified difference signal reverses as the phase relation between the difference signal and the reference pulses changes. The second contact of the reed switch 128 is coupled to a filter circuit 211 including a series resistor 210 and the parallel capacitors 212 and 214. A direct current control signal is developed by the filter circuit 211.

The control signal developed by the filter circuit 211 is applied to a control grid of a tube 216 connected as a voltage regulator for the power supply 162. The cathode and the suppressor grids of the tube 216 are connected to ground through a diode 218 and through a resistor 220 to a source of biasing potential 222 (illustrated as a battery). The screen grid is also connected to the source of biasing potential 222.

The high voltage power supply 162 includes a transformer 224 having a primary winding 226 adapted to be connected to a source of alternating current such as a line voltage. The transformer 224 includes a secondary winding 228 having a step-up turns ratio with respect to the primary winding 226. The ends of the secondary winding are connected to separate rectifier diodes 230 and 232 while the center tap is connected to a common lead 234. The diodes 230 and 232 function as full wave rectifiers to provide a pulsating direct current to a filter circuit 237 including a series resistor 236 and the parallel capacitors 238 and 240 connected between the opposite ends of the series resistor 236 and the common lead 234.

A control resistor 242 is connected in shunt with the capacitor 240 to provide a means for controlling the amplitude of voltage applied to the photomultiplier tube 36. The voltage applied to the photomultiplier tube 36 is controlled by controlling the conduction of the tube 216 with the control signal developed by the filter circuit 211. For example, if the reference pulses are too big the control signal causes the tube 216 to increase in its conduction so that a greater voltage drop is experienced across the control resistor 242 thereby reducing the voltage across the photomultiplier tube 36 and also the gain thereof and vice versa.

As previously mentioned, the polarity of the rectified difference signal applied to the filter circuit 211 changes as the phase relation between the difference signal and the reference pulses changes. This change in polarity provides the gain control circuit with a bidirectional driving means for charging or discharging the filter circuit 211 for increased and decreased reference pulse heights resulting in a rapidly responding gain control system. In contrast if signals of a single polarity where employed, the filter circuit would be rapidly charged to follow an increase in applied rectified pulse height, but the discharge of the filter circuit (due to decreased rectified pulse height) would be primarily dependent upon its R-C (resistance-capacitance) time constant.

Figure 7:
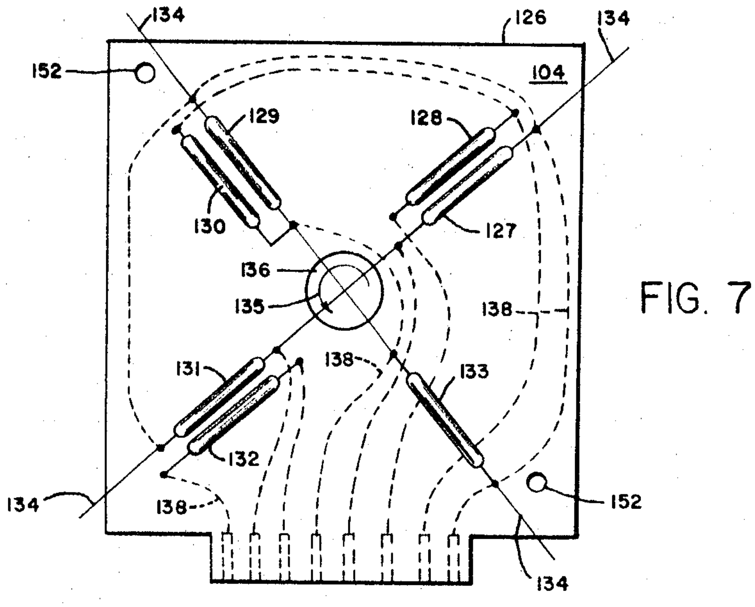
FIGURE 7 is an illustration of the mounting means for the reed switches of FIGURE 5.

Referring now to FIGURES 3, 5, 7 and 11, as the magnetic shield 106 rotates in the direction designated by the arrow 117 in FIGURE 5, the window 149 passes the switches 127–133 in a counterclockwise direction indicated by the arrow 135 in FIGURE 7. All the switches 127–133 are normally open until actuation by the magnetic field. The positions of the printed circuit board 126 and the disk 112 are so adjusted with respect to the beam switch disks 48 and 50 so that the switches 127 and 128 close after the reference pulse 58 reaches its peak value or plateau designated by the point A of FIGURE 3. The switches 127 and 128 remain closed until point B (before the reference pulse 58 begins to drop off). The switch 127 channels an approximate square wave reference pulse to the summing resistor 198 while the switch 131 (which is open) blocks the reference pulses from entering the sample processing channel.

At the point C the switches 129 and 130 close shorting to ground one end of the capacitors 176 and 208 respectively. At this time no radiation is being applied to the photomultiplier tube 136 and the only signal generated is the dark current signal wherein the switches 129 and 130 provide a zero signal reference level for this system. The switches 129 and 130 remain closed until point D. After the sample pulse 60 has reached its full height, point E, the switches 131 and 132 are synchronized to close. The switch 131 applies an approximate square wave sample pulse to the sample processing channel while the switch 127 (open at this time) blocks the sample pulses in the reference channel. The square wave sample pulse at this time is either integrated by the combination of the resistors 180 and 182 and measured by the meter 183 or else (depending upon the position of the switch 178) rectified by the operation of the reed switch 132 to develop a direct current voltage in the filter circuit 187. The switches 131 and 132 remain closed until point E before the sample pulse begins to drop off.

At point G the switch 133 is closed connecting the capacitor 176 to ground and establishing a zero signal reference level for the next following reference pulse. The switch 133 remains closed until point H before the photomultiplier tube begins to generate the reference pulse. The sequence is repeated continuously.

Magnetic actuated switches such as the reed switches 127–133 generally vary in switching characteristics wherein the minimum magnetic pull in and drop out values vary over wide tolerances. In addition, these pull in and drop out values change with use due to metal fatigue and arcing between contacts. As a result, it was found that a single rotating magnet to actuate these switches at high speed was ineffective. This is because of the gradual buildup of the magnetic field as the rotating magnet approached the switches. For accurate and predictable switching with a system employing simple rotating magnet matched groups of switches having the same pull in and pull out values are required or means for providing individual switch adjustments. This is expensive.

On the other hand, the magnetic field generated by the magnetic means 102 is a great deal stronger than that required to actuate the reed switches. The magnetic shield acts as a switch effectively applying the full field strength for actuating the switch and then rapidly removing the magnetic field providing a sharp off-on action. As a result the switches are accurately timed to switch at the designated points A–H (FIGURE 3).

This has a particular advantage in the case of the integrating circuit 181. The capacitor 182 is charged to a level depending upon the peak value of the sample pulse 60 and retains its charge for a period of time. Since the switch 131 closes and opens while the sample pulse has reached its plateau or peak value, the capacitor is charged by the difference between a fixed voltage level (signal pulse plateau) and the charge retained from the prior sample pulse. As a result the amplifier 174 (the charging means) can exhibit a higher output impedance (resulting in simpler design and less expensive amplifier) than one required to apply the entire reference pulse to the integrating circuit.

In addition, the accurate switching of the switches 128 and 132 provides for a more reliable detection action that can normally be had with the rectifying devices such as diodes etc. For example, a diode requires a fixed amount of forward voltage drop before it acts as a rectifier. This forward voltage drop introduces an error particularly noticeable in low level signals. In contrast the switches 128 and 132 do not have a forward voltage drop providing a more accurate detection action.

I claim:

1. The combination comprising:

at least one detecting device for generating an electrical signal in response to a physical quantity applied thereto;

switching means adapted to apply a plurality of physical quantities to said detecting device in a consecutive timing sequence;

an electrical motor having a movable shaft;

means for coupling said switching means to said electrical motor so that said switching means applies physical quantities to said detecting device in a consecutive timing sequence in synchronization with the movement of said shaft;

a plurality of switching devices at least one for each of said plurality of physical quantities being responsive to a magnetic field for actuation thereof mounted along a circular path;

magnetic means mounted adjacent said plurality of switching devices for developing a magnetic field for actuation of said switching devices;

a magnetic shield mounted for rotary movement along said circular path between said plurality of switching devices and said magnetic means for blocking said magnetic field from actuating selected ones of said switching devices depending upon the positioning of said magnetic shield;

means coupling said magnetic shield to said motor shaft for synchronizing the movement of said magnetic shield with the movement of said shaft so that the movement of said magnetic shield provides for the actuation of said switching devices in synchronous relation with the movement of the motor shaft, and circuit means coupling said detecting device to said plurality switching devices for applying electrical signals thereto so that said switching devices provide separate signals for said plurality of physical quantities.

2. The combination comprising:

means for providing a beam of radiation;

beam splitting means for splitting said beam into a plurality of beams of radiation;

a radiation sensitive device for generating an electrical signal in response to radiation applied thereto;

means for directing said plurality of beams of radiation along separate paths to impinge on said radiation sensitive device;

modulation means for sequentially interrupting said plurality of beams of radiation so that said plurality of beams of radiation are sequentially applied to said radiation sensitive device wherein said radiation sensing device produces a composite signal including a series of pulses, at least one of said series of pulses being proportional to the radiation energy level of a corresponding one of said plurality of beams of radiation;

motor means coupled to drive said modulation means;

a plurality of switching devices being responsive to a magnetic field for actuation thereof mounted along a circular path;

magnetic means mounted adjacent said plurality of switching devices for developing magnetic flux for actuation thereof;

a magnetic shield movably mounted for rotation along said circular path between said magnetic means and said plurality of switching devices, said magnetic shield having a magnetic flux transmitting window therein providing a path for said magnetic flux for actuating selected ones of plurality of switching devices depending upon the position thereof;

means coupling said magnetic shield to said motor means for synchronizing the movement of said magnetic shield with the sequential interruption of said plurality of beams of radiation so that said magnetic shield provides for the actuation of said plurality of switching devices through said window in synchronous relation to the composite signal generated by said radiation sensitive device, and circuit means coupling said radiation sensitive device to said plurality of switching devices so that said switching devices function to separate the signals generated by said radiation sensitive device in response to each of said plurality of beams of radiation.

3. The combination defined in claim 2 wherein:

said modulation means includes a plurality of disks mounted to rotate about a shaft, each of said disks having a radiation transmitting window therein, wherein at least a separate one of said plurality of disks is positioned in each of said separate paths so that said window passes a beam of radiation to said radiation sensitive device when rotated into the path of said beam of radiation and wherein said shaft is driven by said motor means, and wherein said means coupling said magnetic sheld to said motor means couples said magnetic shield to said shaft to rotate in synchronization with said shaft so that said shield window follows said circular path.

4. The combination defined in claim 3 wherein:

said plurality of switching devices are adjustably mounted for movement along said circular path so that the positioning of said plurality of switching devices with respect to said windows in said plurality of disks can be adjusted to provide the desired timing between the interruption of the plurality of beams of radiation and the actuation of said switches.

5. The combination defined in claim 2 wherein:

said plurality of switching devices are mounted on a circular plate that is adjustably mounted for movement along said circular path so that said switching devices can be rotated together about said circular path and the switching devices can be adjusted to provide the proper phasing between the actuation thereof and said composite signal.

6. The combination defined in claim 5 wherein:

said plurality of switching device includes at least one switching device for each of said plurality of beams of radiation wherein said switch corresponding to a beam of radiation is actuated and deactuated during at least a portion of the time the corresponding beam of radiation impinges on said radiation sensitive device.

7. The combination as defined in claim 3 wherein:

said plurality of switching devices include at least two switching devices for each of said plurality of beams of radiation wherein one of said switching devices is actuated and deactuated for a period immediately preceding a signal generated by said radiation sensitive device by a corresponding beam of radiation impinging on said radiation device to provide a reference signal level, and the other one of said switching devices is actuated and deactuated during at least a portion of the time said corresponding beam of radiation impinges on said radiation sensitive device.

References Cited

UNITED STATES PATENTS

| | | | |
|---|---|---|---|
| 3,039,353 | 6/1962 | Coates et al. | |
| 3,210,498 | 10/1965 | Jackson et al. ------- | 335—206 |
| 3,257,562 | 6/1966 | Erdman et al. | |

RALPH G. NILSON, Primary Examiner

S. C. SHEAR, Assistant Examiner

U.S. Cl. X.R.

88—14